(12) United States Patent
Hou

(10) Patent No.: US 6,290,568 B1
(45) Date of Patent: Sep. 18, 2001

(54) MONITOR TOY ASSEMBLY

(76) Inventor: Chin-Jung Hou, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/549,429

(22) Filed: Apr. 14, 2000

(51) Int. Cl.$^7$ .................................................. A63H 33/30
(52) U.S. Cl. ........................................ 446/408; 446/228
(58) Field of Search ............................ 446/408, 69, 228, 446/229; 348/143, 151

(56) References Cited

U.S. PATENT DOCUMENTS 4,225,881 * 9/1980 Tovi ...................................... 348/151
4,654,703 * 3/1987 Viera ..................................... 348/143

* cited by examiner

Primary Examiner—Sam Rimell

(57) ABSTRACT

A monitor toy assembly includes a rotary platform mounted on a lower portion of a support frame to pivot relative to the support frame along a horizontal axis of the rotary platform, a casing secured on the rotary platform to pivot therewith and rotatable relative to the rotary platform along a vertical axis of the casing, an actuating device mounted in the casing for rotating the casing relative to the rotary platform, a battery box secured on a bottom of the casing for supplying power to the actuating device, and a front cover secured on a front side of the casing and including a camera lens extending outward therefrom, a sensor mounted therein, and a light emitting component mounted therein.

13 Claims, 10 Drawing Sheets

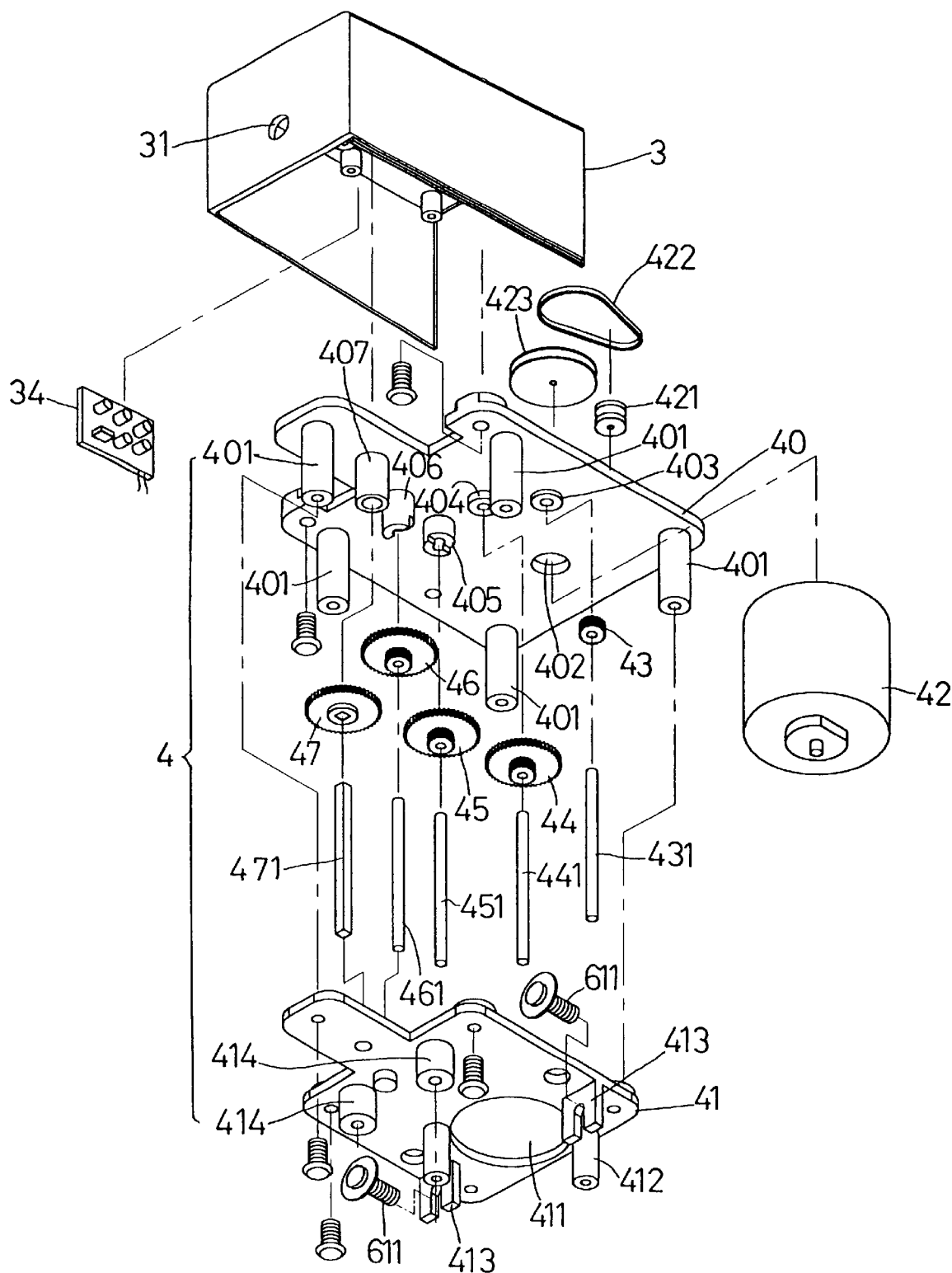
FIG. 2-A

US 6,290,568 B1

MONITOR TOY ASSEMBLY

BACKGROUND OF THE INVENTION

1. Field of the Invention

The present invention relates to a monitor toy assembly.

2. Description of the Related Art

A conventional toy sold in the market is commonly used for a child to play with so as to achieving an amusing and playing effect. However, the conventional toy can only provide a monotonous and tedious amusement to the children without a functional variation, and cannot be adapted to have any other utility effect so that such a conventional toy cannot fit the practical requirement in the modern world, thereby greatly limiting the versatility of the conventional toy.

SUMMARY OF THE INVENTION

In accordance with one aspect of the present invention, there is provided a monitor toy assembly comprising: a support frame; a rotary platform pivotally mounted on a lower portion of the support frame to pivot relative to the support frame along a horizontal axis of the rotary platform; a casing secured on the rotary platform to pivot therewith and being rotatable relative to the rotary platform along a vertical axis of the casing; an actuating device mounted in the casing for rotating the casing relative to the rotary platform; a battery box secured on a bottom of the casing for supplying power to the actuating device; and a front cover secured on a front side of the casing and including a camera lens extending outward therefrom, a sensor mounted therein, and a light emitting component mounted therein.

Further benefits and advantages of the present invention will become apparent after a careful reading of the detailed description with appropriate reference to the accompanying drawings.

BRIEF DESCRIPTION OF THE DRAWINGS

FIG. 2-A is a partially exploded view of the monitor toy assembly as shown in FIG. 1;

DETAILED DESCRIPTION OF THE INVENTION

Figure 1:
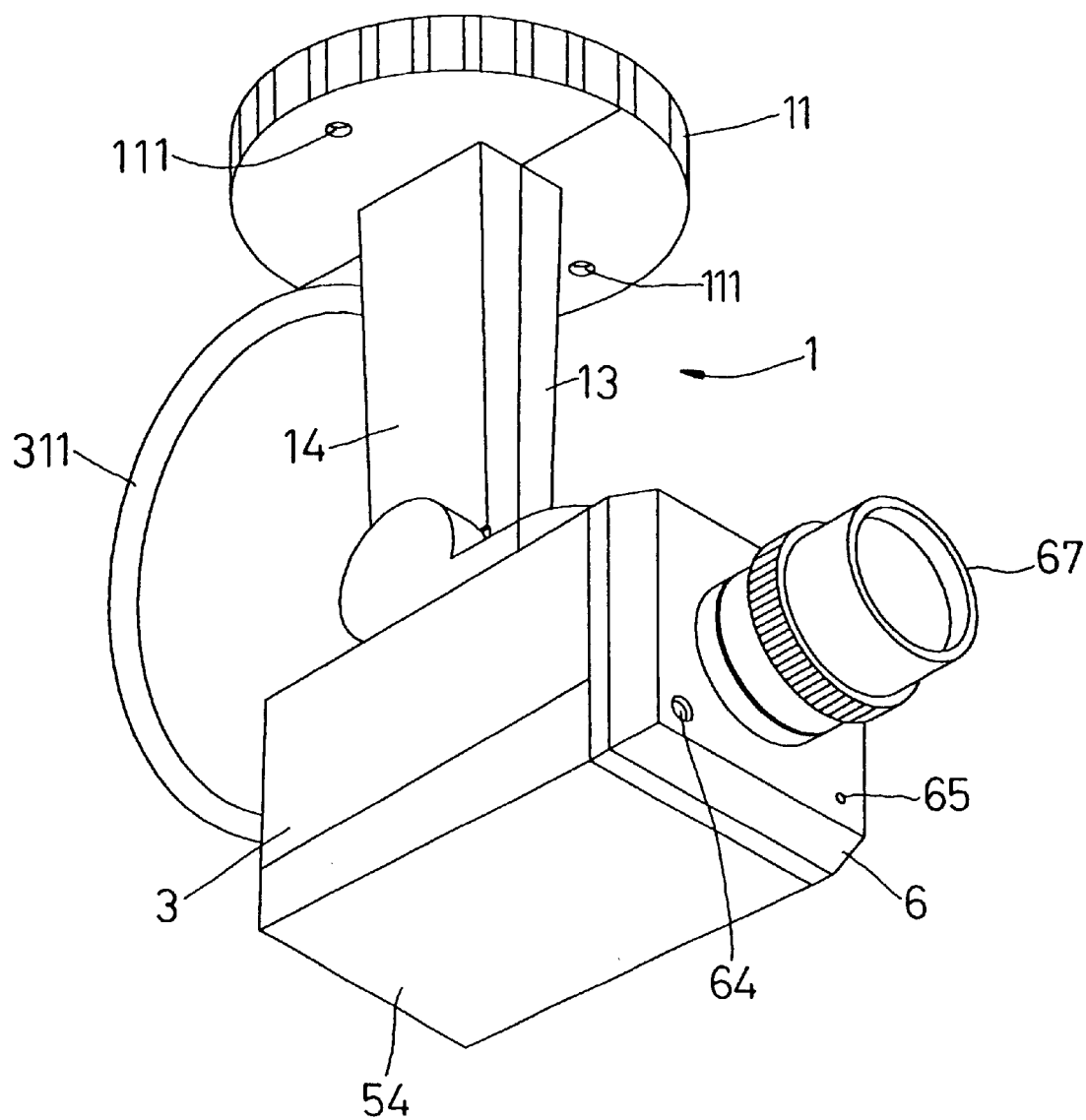
FIG. 1 is a perspective view of a monitor toy assembly in accordance with the present invention.
Figure 2:
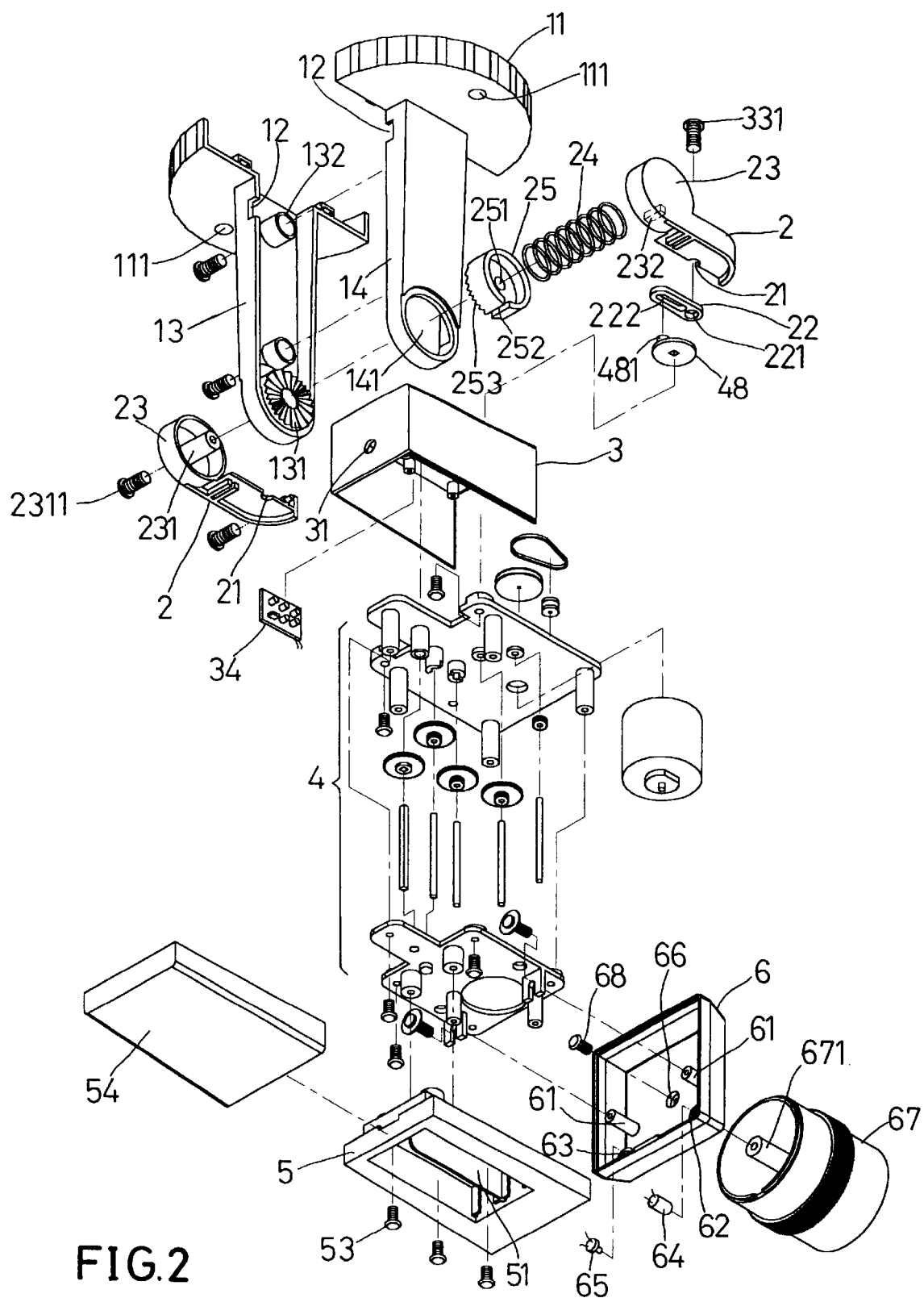
FIG. 2 is a partially exploded view of the monitor toy assembly as shown in FIG. 1.
Figure 3:
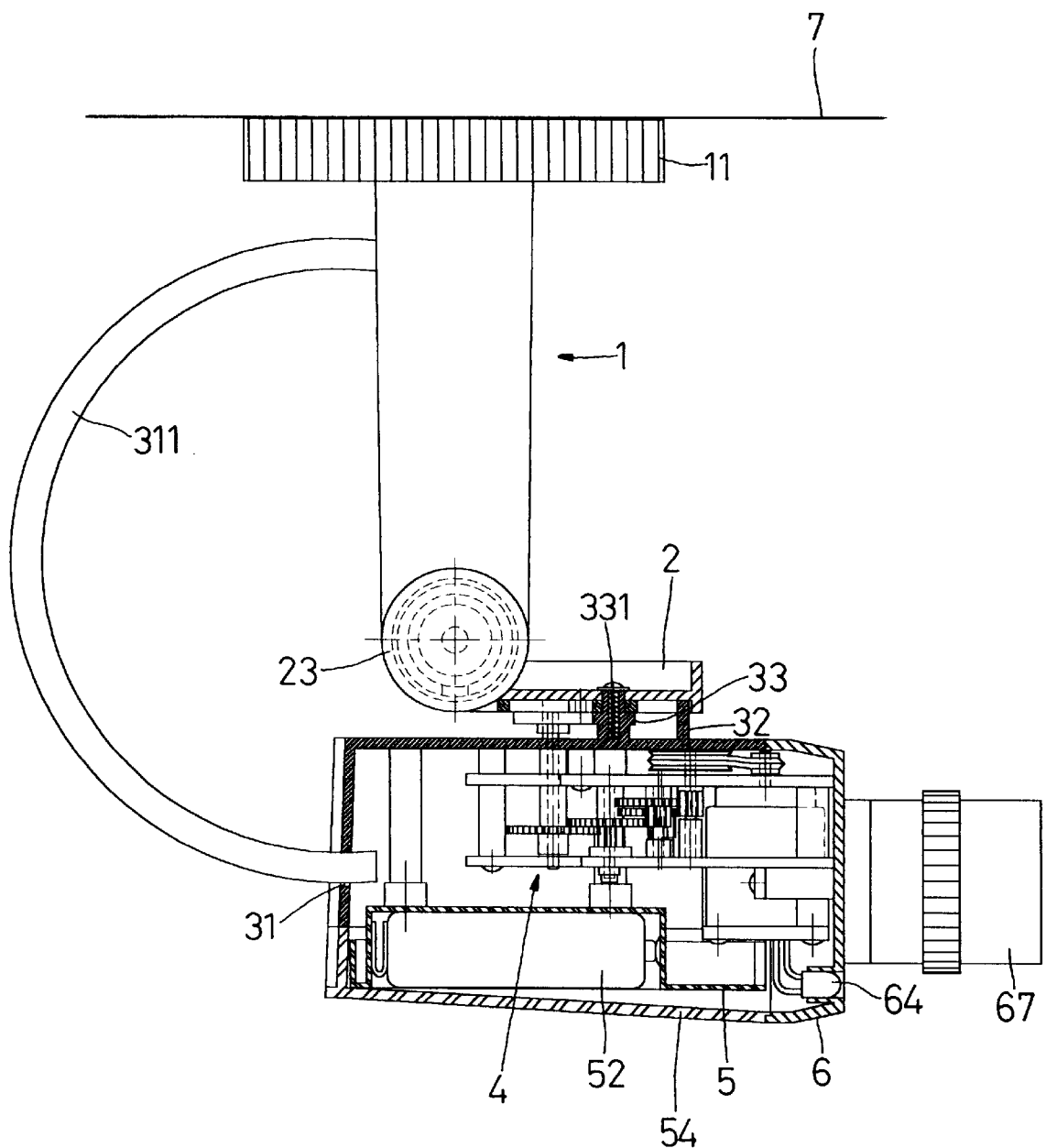
FIG. 3 is a front plan cross-sectional view of the monitor toy assembly as shown in FIG. 1.
Figure 4:
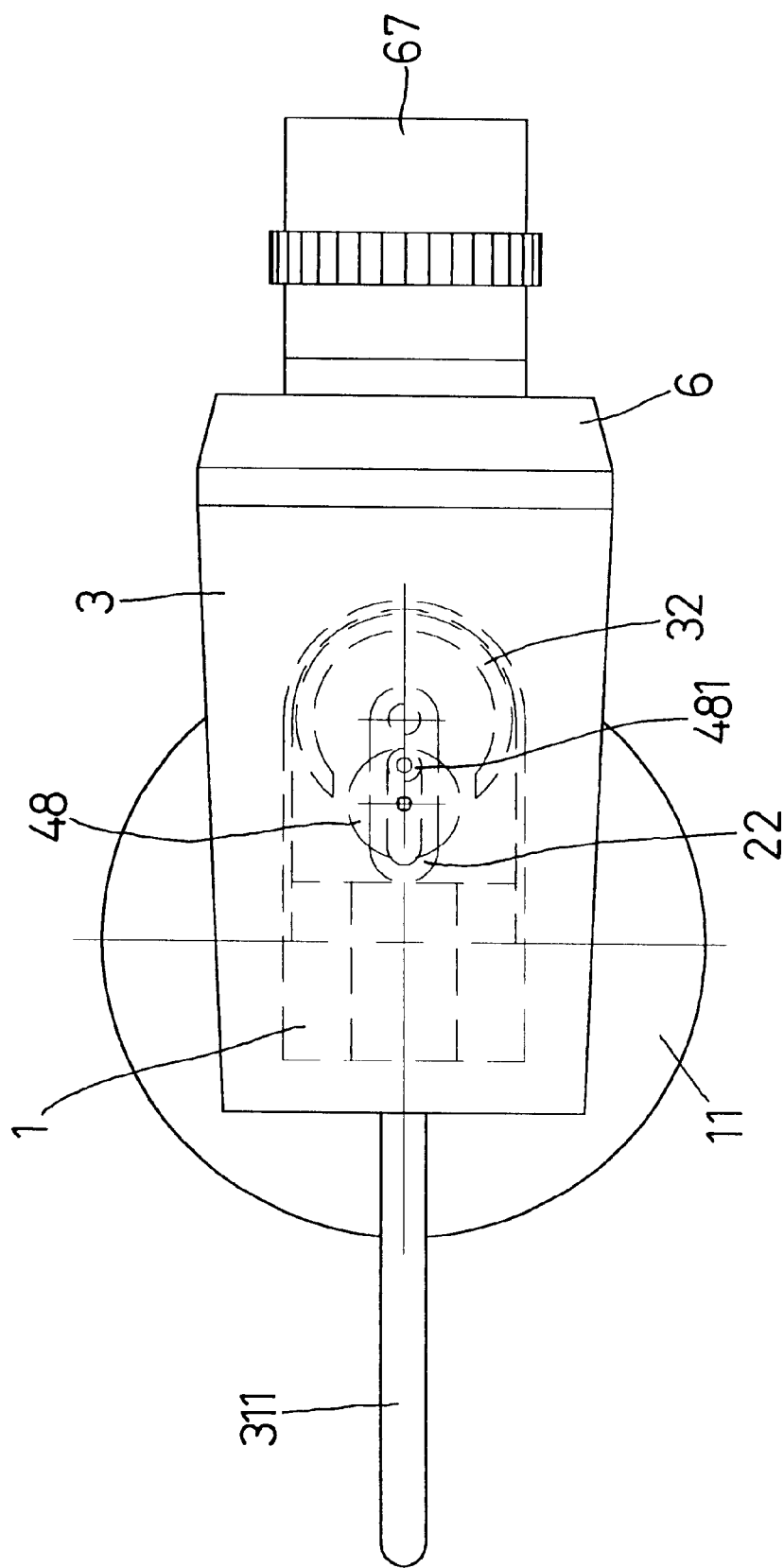
FIG. 4 is a bottom plan view of the monitor toy assembly as shown in FIG. 1.
Figure 5:
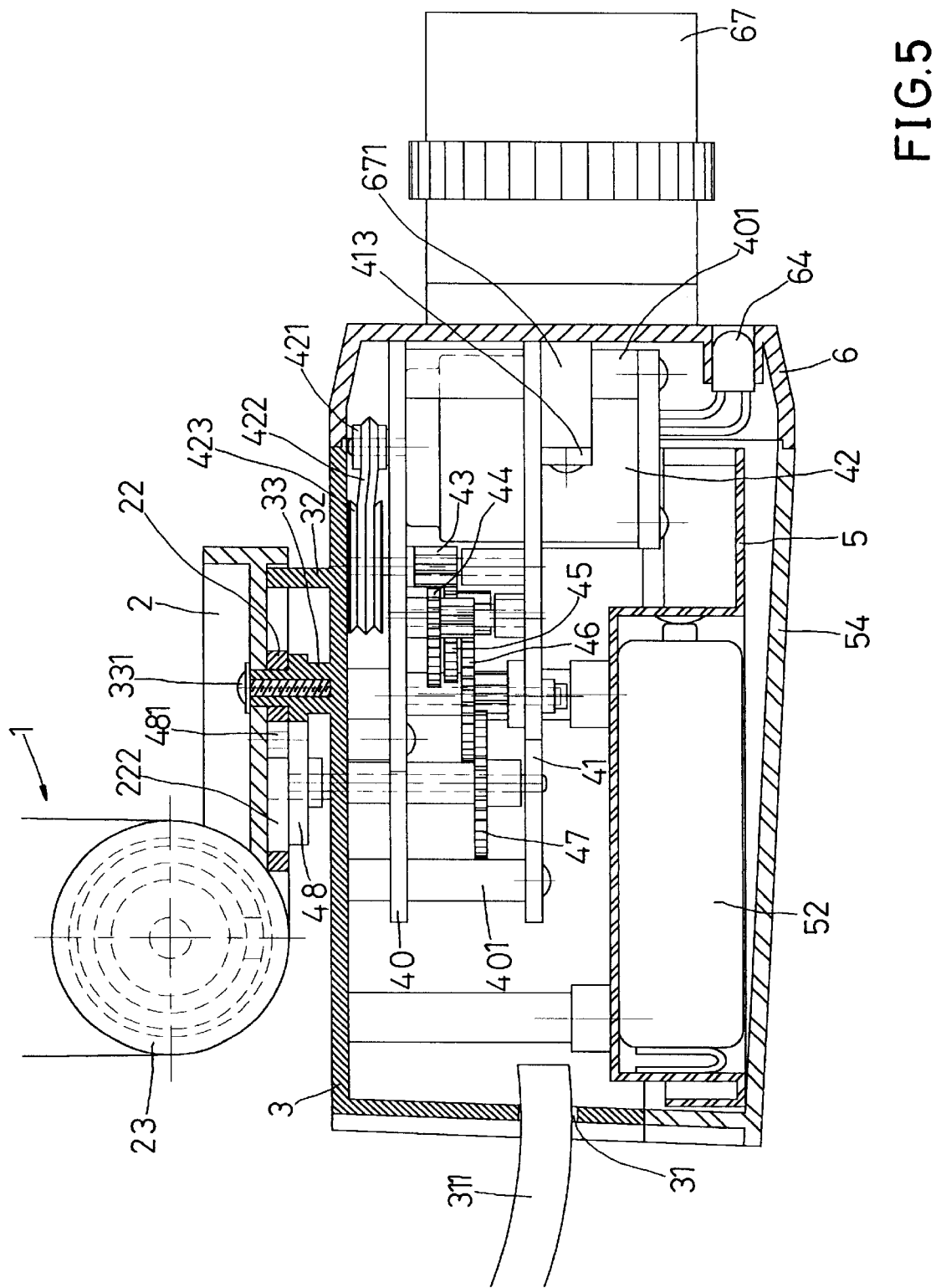
FIG. 5 is an enlarged front plan cross-sectional view of the monitor toy assembly as shown in FIG. 1.
Figure 6:
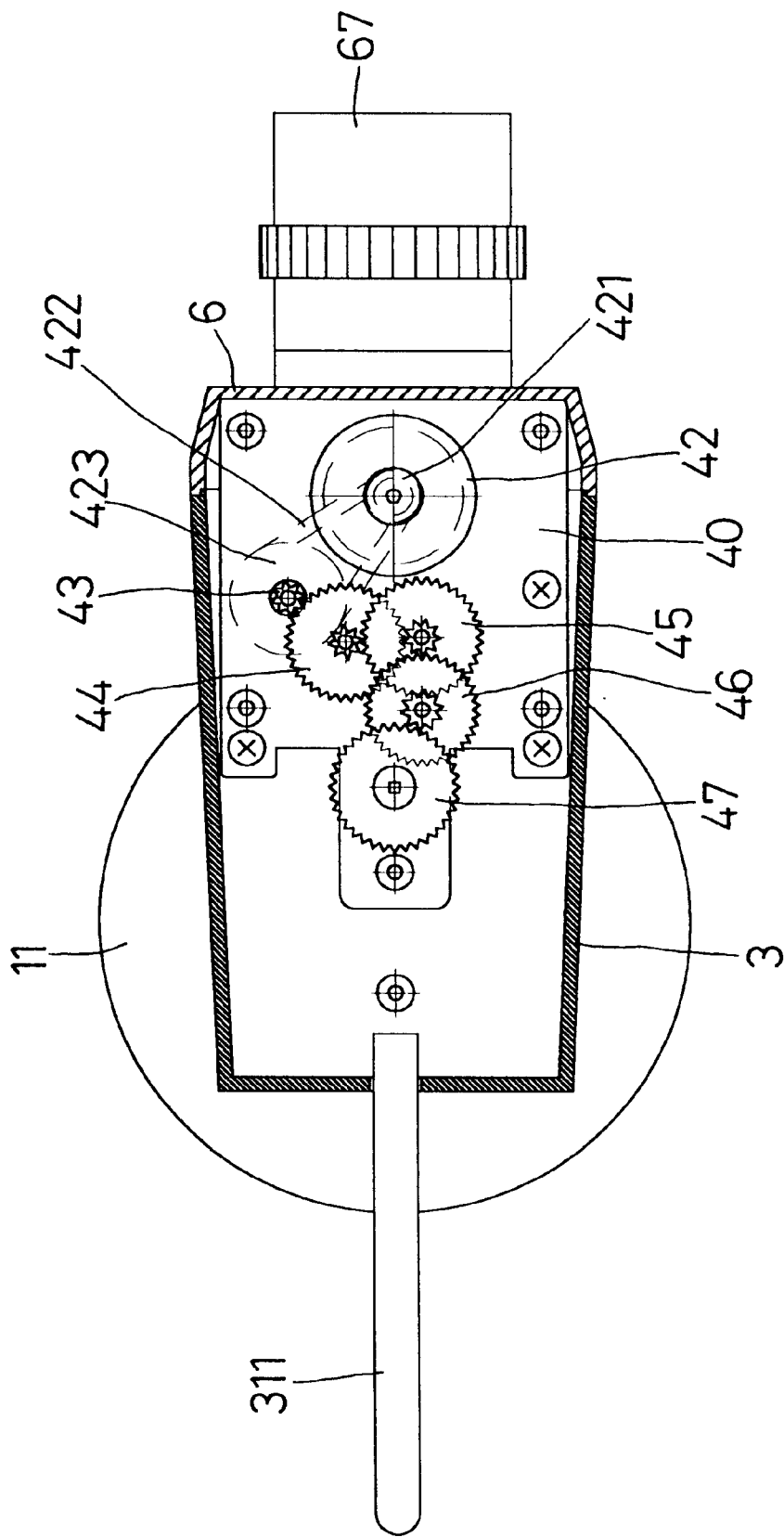
FIG. 6 is a bottom plan cross-sectional view of the monitor toy assembly as shown in FIG. 1.

Referring to the drawings and initially to FIGS. 1–6, a monitor toy assembly in accordance with the present invention comprises a support frame 1, a rotary platform 2 pivotally mounted on a lower portion of the support frame 1 to pivot relative to the support frame 1 along a horizontal axis of the rotary platform 2, a casing 3 secured on the rotary platform 2 to pivot therewith and being rotatable relative to the rotary platform 2 along a vertical axis of the casing 3, an actuating device 4 mounted in the casing 3 for rotating the casing 3 relative to the rotary platform 2, a battery box 5 secured on a bottom of the casing 3 for supplying power to the actuating device 4, and a front cover 6 secured on the front side of the casing 3 and including a camera lens 67 extending outward therefrom, a sensor 65 mounted therein, and a light emitting component 64 mounted therein.

The support frame 1 includes a base disk 11 defining two through holes 111, and an upright post extending downward from the base disk 11 and defining a rectangular hole 12. The upright post includes a first side plate 13 and a second side plate 14 coupled with each other. The first side plate 13 has a lower portion formed with a circular radially arranged first engaging teeth surface 131, and the second side plate 14 has a lower portion defining a circular hole 141 for receiving the engaging teeth surface 131.

Each of the first side plate 13 and the second side plate 14 includes two studs 132, and two locking screws 1321 each extending through the stud 132 for securing the first side plate 13 and the second side plate 14 together.

The casing 3 defines a through hole 31, and includes an integrated circuit board 34 mounted therein and connected to the sensor 65 and the light emitting component 64 by electric wires, and a cable 311 having a first end attached to the rectangular hole 12 of the upright post of the support frame 1 and a second end attached to the through hole 31 of the casing 3.

The rotary platform 2 includes two hollow pivot ears 23 each pivotally mounted on a respective one of the first side plate 13 and the second side plate 14 of the support frame 1 and each having a threaded column 231, and a locking screw 2311 extending through the threaded column 231 of each of the two pivot ears 23 for securing the two pivot ears 23 together.

One of the two pivot ears 23 includes a retaining block 232, and the rotary platform 2 includes a clutch wheel 25 secured on the pivot ear 23 and defining a central hole 251 for receiving the threaded column 231 of the pivot ear 23, a cutout 252 defined in the clutch wheel 25 for receiving the retaining block 232, a circular radially arranged second engaging teeth surface 253 formed on the clutch wheel 25 and detachably engaged with the circular radially arranged first engaging teeth surface 131 of the first side plate 23, and a spring 24 mounted between the clutch wheel 25 and the pivot ear 23.

The rotary platform 2 defines a first circular hole 21 and includes a linking lever 22 secured on the casing 3 and defining a second circular hole 221 and an elongated slot 222, the casing 3 has a top wall including a C-shaped lug 32 (see FIG. 4), and a threaded post 33 (see FIG. 5) extending through the second circular hole 221 of the linking lever 22 and the first circular hole 21 of the rotary platform 2, and a locking screw 331 screwed on the threaded post 33 for securing the rotary platform 2 and the linking lever 22 on the threaded post 33 of the casing 3, and the actuating device 4 includes an eccentric wheel 48 rotatably mounted on the top wall of the casing 3, and an eccentric rod 481 secured on the eccentric wheel 48 to rotate therewith and slidably received in the elongated slot 222 for pivoting the linking lever 22.

The actuating device 4 essentially includes an upper support plate 40 secured in the casing 3 and defining a first circular hole 402, a plurality of support columns 401 secured on the upper support plate 40, a lower support plate 41 secured on the support columns 401 of the upper support plate 40 and defining a second circular hole 411 having a diameter greater than that of the first circular hole 402, a motor 42 received in the second circular hole 411 of the lower support plate 41 and including a shaft extending through the first circular hole 402, a first belt wheel 421 secured on the shaft of the motor 42 to rotate therewith, and a second belt wheel 423 rotated by the first belt wheel 421 through a belt 422, a pinion 43 rotated by the second belt wheel 423, a first reduction gear 44 meshing with the pinion 43 to rotate therewith, a second reduction gear 45 meshing with the first reduction gear 44 to rotate therewith, a third reduction gear 46 meshing with the second reduction gear 45 to rotate therewith, and a fourth reduction gear 47 meshing with the third reduction gear 46 to rotate therewith and engaged with the eccentric wheel 48 for rotating the eccentric wheel 48.

The upper support plate 40 includes a first support stub 403 abutting the pinion 43, a second support stub 404 abutting the first reduction gear 44, a third support stub 405 abutting the second reduction gear 45, a fourth support stub 406 abutting the third reduction gear 46, and a fifth support stub 407 abutting the fourth reduction gear 47, and the actuating device 4 also includes a circular first drive shaft 431 in turn extending through the pinion 43, the first support stub 403 and the second belt wheel 423, a circular second drive shaft 441 in turn extending through the first reduction gear 44 and the second support stub 404, a circular third drive shaft 451 in turn extending through the second reduction gear 45 and the third support stub 405, a circular fourth drive shaft 461 in turn extending through the third reduction gear 46 and the fourth support stub 406, and a rectangular fifth drive shaft 471 in turn extending through the fourth reduction gear 47, the fifth support stub 407 and secured in the eccentric wheel 48.

The lower support plate 41 includes a plurality of threaded posts 414, and the battery box 5 includes a plurality of locking screws 53 each extending through a bottom of the battery box 5 and screwed into the threaded post 414 for securing the battery box 5 to the lower support plate 41, a chamber 51 defined in the battery box 5 for receiving a battery 52, and a battery cover 54 mounted on a bottom of the battery box 5.

The lower support plate 41 includes two support columns 412 each located beside the second circular hole 411, and two U-shaped abutting plates 413 each located beside the respective support column 412, and the front cover 6 includes two horizontally arranged threaded posts 61 each abutting the respective abutting plate 413, and two locking screws 611 each extending through the abutting plate 413 and screwed into the threaded post 61 for securing the front cover 6 to the lower support plate 41.

The front cover 6 defines a receiving hole 63 for receiving the sensor 65, a receiving hole 62 for receiving the light emitting component 64, and a screw hole 66, and the camera lens 67 includes a threaded post 671, and a locking screw 68 extending through the screw hole 66 and screwed into the threaded post 671 for securing the camera lens 67 to the front cover 6.

Figure 7:
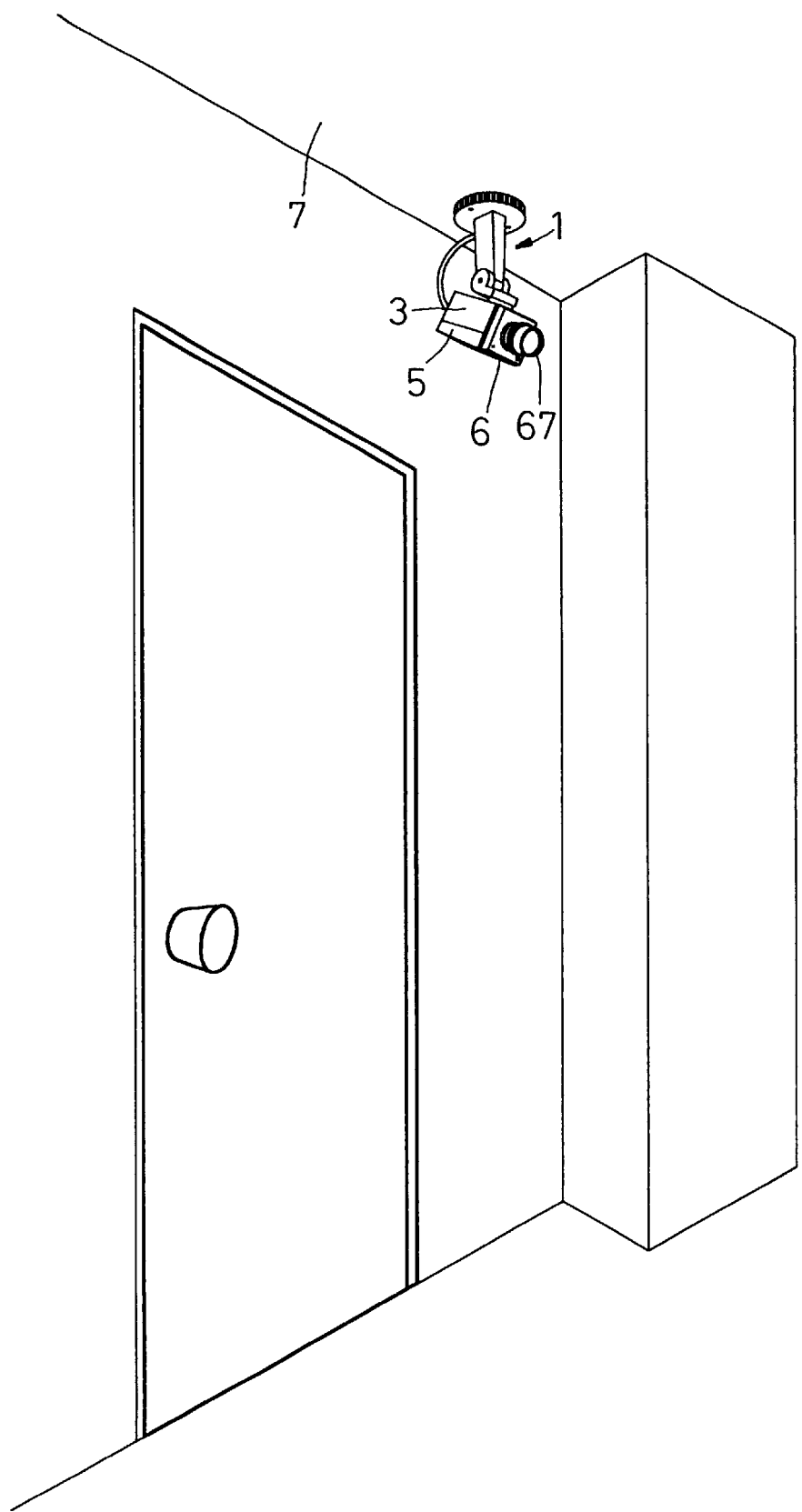
FIG. 7 is a schematic view showing an embodiment of the monitor toy assembly as shown in FIG. 1.
Figure 8:
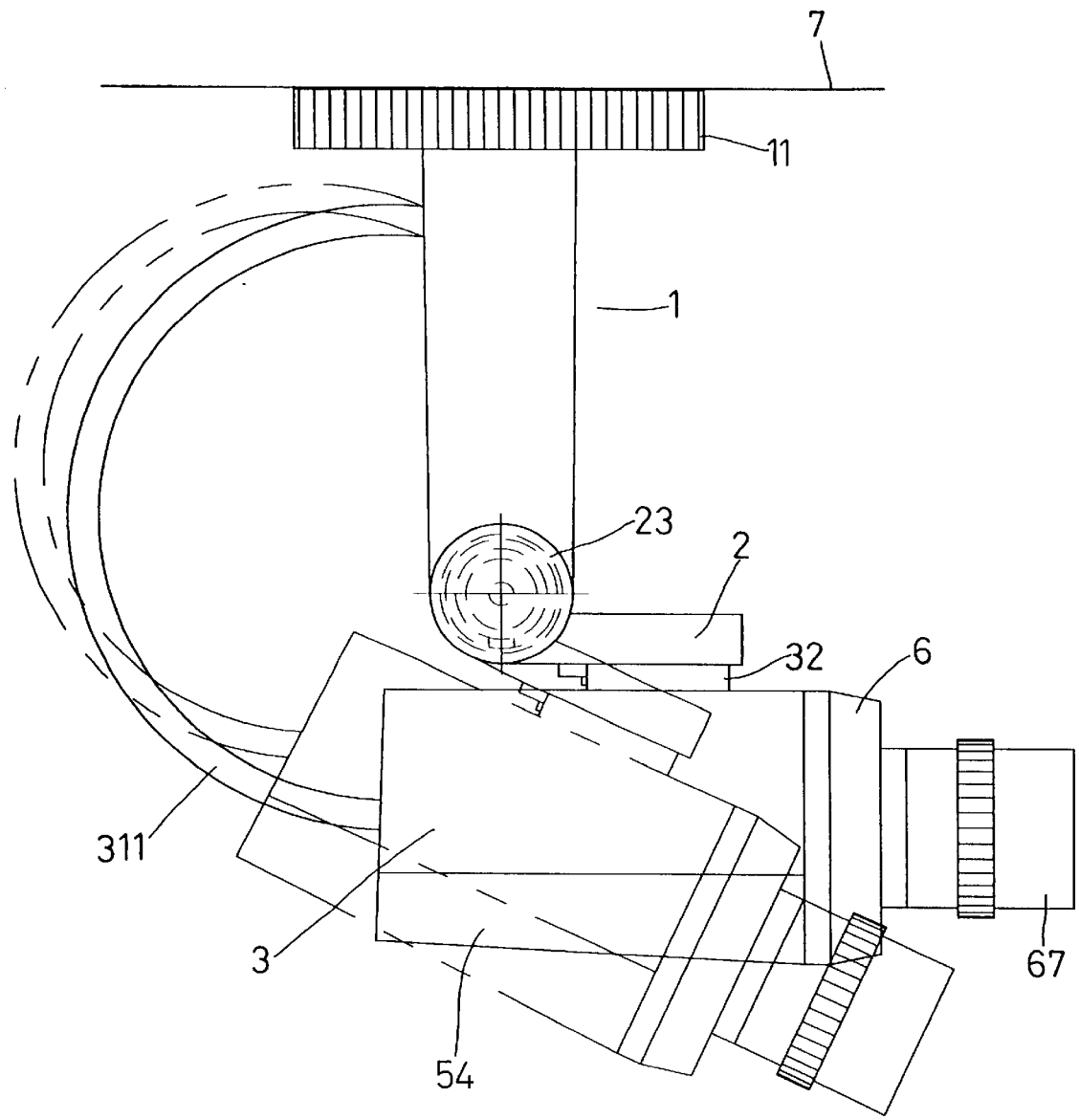
FIG. 8 is a front plan operational view of the monitor toy assembly as shown in FIG. 7.

In operation, referring to FIGS. 7–10 with reference to FIGS. 1–6, the support frame 1 of the monitor toy assembly is initially secured to a ceiling 7 of an office as shown in FIG. 7. The rotary platform 2 can be pivoted relative to the support frame 1 as shown in FIG. 8, thereby adjusting the inclined angle of the casing 3 so that the camera lens 67 can align with a optimal position of the inlet of the office.

Figure 9:
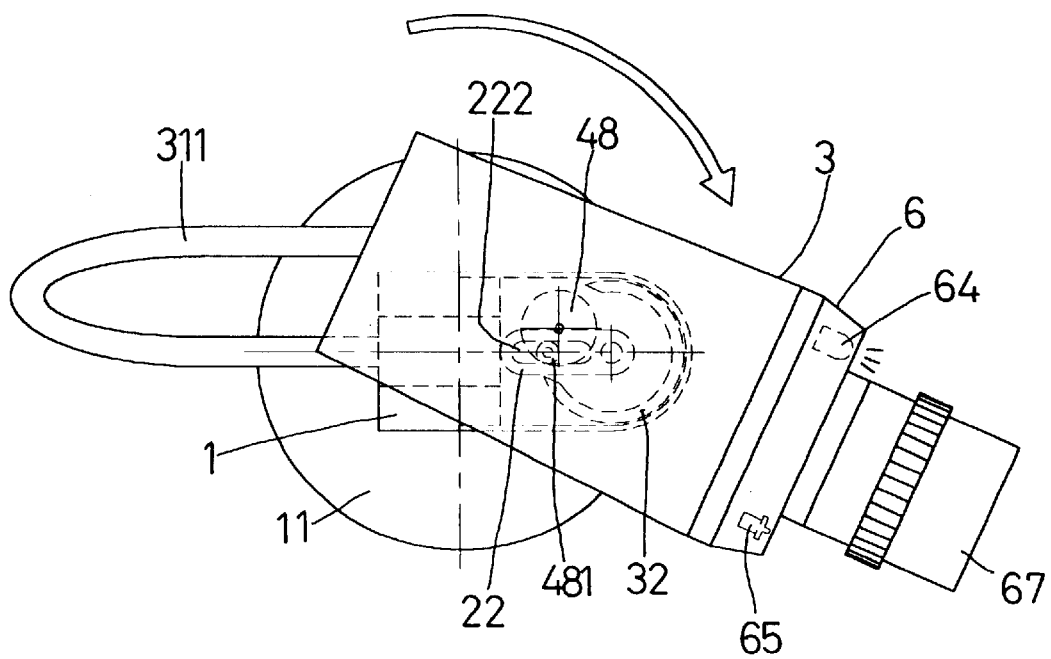
FIG. 9 is a top plan view of the monitor toy assembly as shown in FIG. 7.
Figure 10:
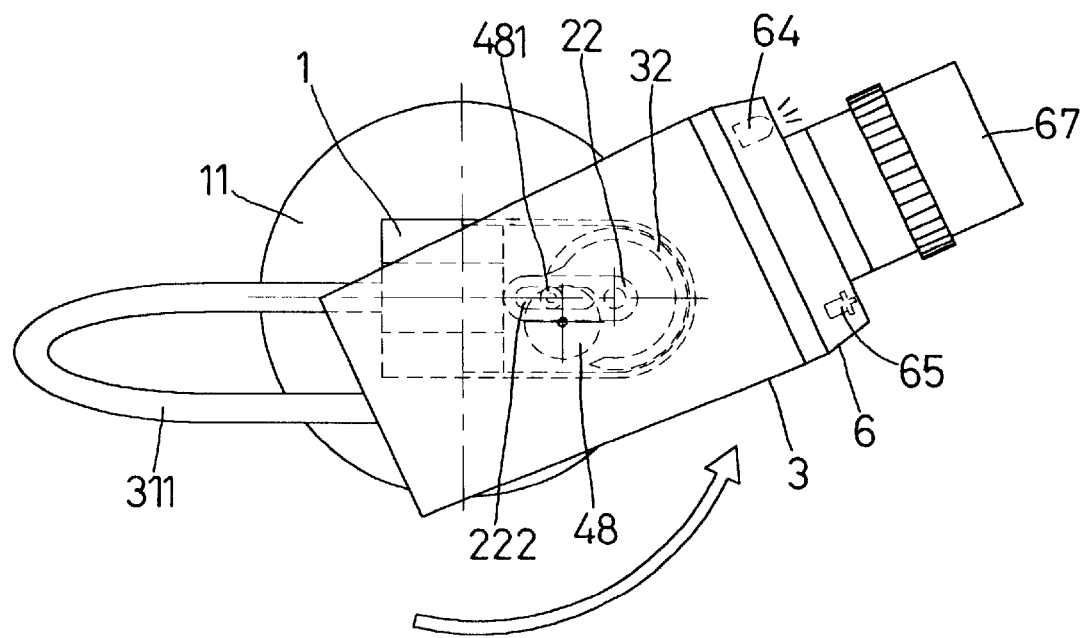
FIG. 10 is an operational view of the monitor toy assembly as shown n FIG. 9.

When the sensor 65 of the front cover 6 detects that a person approaches the inlet of the office, the detected signal is then delivered to the integrated circuit board 34 which then drives the actuating device 4 to operate the motor 42 (see FIGS. 5 and 6) which rotates its shaft which rotates the first belt wheel 421 which rotates the second belt wheel 423 through the belt 422 to rotate the pinion 43 which in turn rotates the first reduction gear 44, the second reduction gear 45, the third reduction gear 46, and the fourth reduction gear 47 which rotates the rectangular drive shaft 471 which rotates the eccentric wheel 48 which moves the eccentric rod 481 in the elongated slot 222 of the linking lever 22, thereby in turn horizontally rotating the casing 3 relative to the rotary platform 2 between the positions as shown in FIGS. 9 and 10 so that the casing 3 can be reciprocally rotated rightward and leftward. At the same time, the light emitting component 64 of the front cover 6 can be adapted to emit light during horizontal rotation of the casing 3 so as to create an active effect like a real monitor so that the monitor shaped toy assembly of the present invention can be simulated as a real monitor, thereby achieving a warning effect.

It should be clear to those skilled in the art that further embodiments may be made without departing from the scope of the present invention.

What is claimed is:

1. A monitor toy assembly comprising:
    a support frame having a base disk defining two through holes, and an upright post extending downward from said base disk and defining a rectangular hole, said upright post including a first side plate and a second side plate coupled with each other, said first side plate having a lower portion formed with a circular radially arranged first engaging teeth surface, and said second side plate having a lower portion defining a circular hole for receiving said first engaging teeth surface;
    a rotary platform pivotally mounted on a lower portion of said support frame to pivot relative to said support frame along a horizontal axis of said rotary platform;
    a casing secured on said rotary platform to pivot therewith and being rotatable relative to said rotary platform along a vertical axis of said casing;
    an actuating device mounted in said casing for rotating said casing relative to said rotary platform;
    a battery box secured on a bottom of said casing for supplying power to said actuating device; and
    a front cover secured on a front side of said casing and including a camera lens extending outward therefrom, a sensor mounted therein, and a light emitting component mounted therein.

2. The monitor toy assembly in accordance with claim 1, wherein each of said first side plate and said second side plate includes two studs, and two locking screws each extending through said stud for securing said first side plate and said second side plate together.

3. The monitor toy assembly in accordance with claim 1, wherein said casing defines a through hole and includes an integrated circuit board mounted therein and connected to said sensor and said light emitting component by electric wires, and a cable having a first end attached to said rectangular hole of said upright post of said support frame and a second end attached to said through hole of said casing.

4. The monitor toy assembly in accordance with claim 1, wherein said rotary platform includes two hollow pivot ears each pivotally mounted on a respective one of said first side plate and said second side plate of said support frame and each having a threaded column, and a locking screw extending through said threaded column of each of said two pivot ears for securing said two pivot ears together.

5. The monitor toy assembly in accordance with claim 4, wherein one of said two pivot ears includes a retaining block, and said rotary platform includes a clutch wheel secured on said pivot ear and defining a central hole for receiving said threaded column of said pivot ear, a cutout defined in said clutch wheel for receiving said retaining block, a circular radially arranged second engaging teeth surface formed on said clutch wheel and detachably engaged with said circular radially arranged first engaging teeth surface said first side plate, and a spring mounted between said clutch wheel and said pivot ear.

6. The monitor toy assembly in accordance with claim 1, wherein said rotary platform defines a first circular hole and includes a linking lever secured on said casing and defining a second circular hole and an elongated slot, said casing has a top wall including a C-shaped lug, and a threaded post extending through said second circular hole of said linking lever and said first circular hole of said rotary platform, and a locking screw screwed on said threaded post for securing said rotary platform and said linking lever on said threaded post of said casing, and said actuating device includes an eccentric wheel rotatably mounted on said top wall of said casing, and an eccentric rod secured on said eccentric wheel to rotate therewith and slidably received in said elongated slot for pivoting said linking lever.

7. The monitor toy assembly in accordance with claim 6, wherein said actuating device includes:

an upper support plate secured in said casing and defining a first circular hole, a plurality of support columns secured on said upper support plate;

a lower support plate secured on said support columns of said upper support plate and defining a second circular hole having a diameter greater than that of said first circular hole;

a motor received in said second circular hole of said lower support plate and including a shaft extending through said first circular hole, a first belt wheel secured on said shaft of said motor to rotate therewith, and a second belt wheel rotated by said first belt wheel through a belt;

a pinion rotated by said second belt wheel;

a first reduction gear meshing with said pinion to rotate therewith;

a second reduction gear meshing with said first reduction gear to rotate therewith;

a third reduction gear meshing with said second reduction gear to rotate therewith;

and a fourth reduction gear meshing with said third reduction gear to rotate therewith and engaged with said eccentric wheel for rotating said eccentric wheel.

8. The monitor toy assembly in accordance with claim 7, wherein said upper support plate includes a first support stub abutting said pinion, a second support stub abutting said first reduction gear, a third support stub abutting said second reduction gear, a fourth support stub abutting said third reduction gear, and a fifth support stub abutting said fourth reduction gear, and said actuating device further includes a circular first drive shaft in turn extending through said pinion, said first support stub and said second belt wheel, a circular second drive shaft in turn extending through said first reduction gear and said second support stub, a circular third drive shaft in turn extending through said second reduction gear and said third support stub, a circular fourth drive shaft in turn extending through said third reduction gear and said fourth support stub, and a rectangular fifth drive shaft in turn extending through said fourth reduction gear, said fifth support stub and secured in said eccentric wheel.

9. The monitor toy assembly in accordance with claim 8, wherein said lower support plate includes a plurality of threaded posts, and said battery box includes a plurality of locking screws each extending through a bottom of said battery box and screwed into said threaded post for securing said battery box to said lower support plate, a chamber defined in said battery box for receiving a battery, and a battery cover mounted on a bottom of said battery box.

10. The monitor toy assembly in accordance with claim 7, wherein said lower support plate includes two support columns each located beside said second circular hole, and two U-shaped abutting plates each located beside said respective support column, and said front cover includes two horizontally arranged threaded post each abutting said respective abutting plate, and two locking screws each extending through said abutting plates and screwed into said threaded post for securing said front cover to said lower support plate.

11. The monitor toy assembly in accordance with claim 10, wherein said front cover defines a receiving hole for receiving said sensor.

12. The monitor toy assembly in accordance with claim 10, wherein said front cover defines a receiving hole for receiving said light emitting component.

13. The monitor toy assembly in accordance with claim 10, wherein said front cover defines a screw hole, and said camera lens includes a threaded post, and a locking screw extending through said screw hole and screwed into said threaded post for securing said camera lens to said front cover.

* * * * *